April 11, 1944. W. B. HUTCHINGS 2,346,259
WATER TEMPERATURE CONTROL
Filed Jan. 27, 1941 2 Sheets-Sheet 1
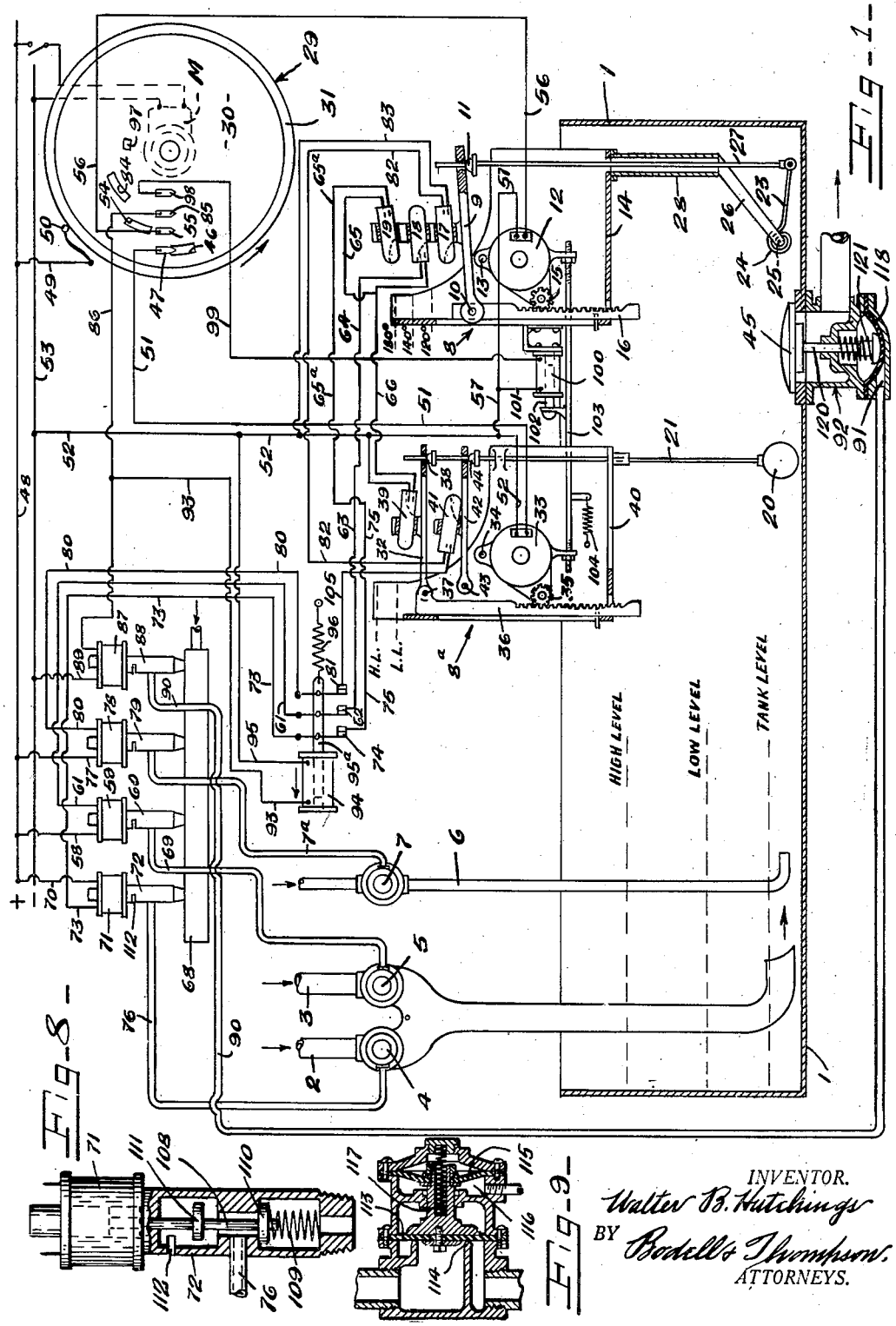
INVENTOR.
Walter B. Hutchings
BY Bodell & Thompson
ATTORNEYS.

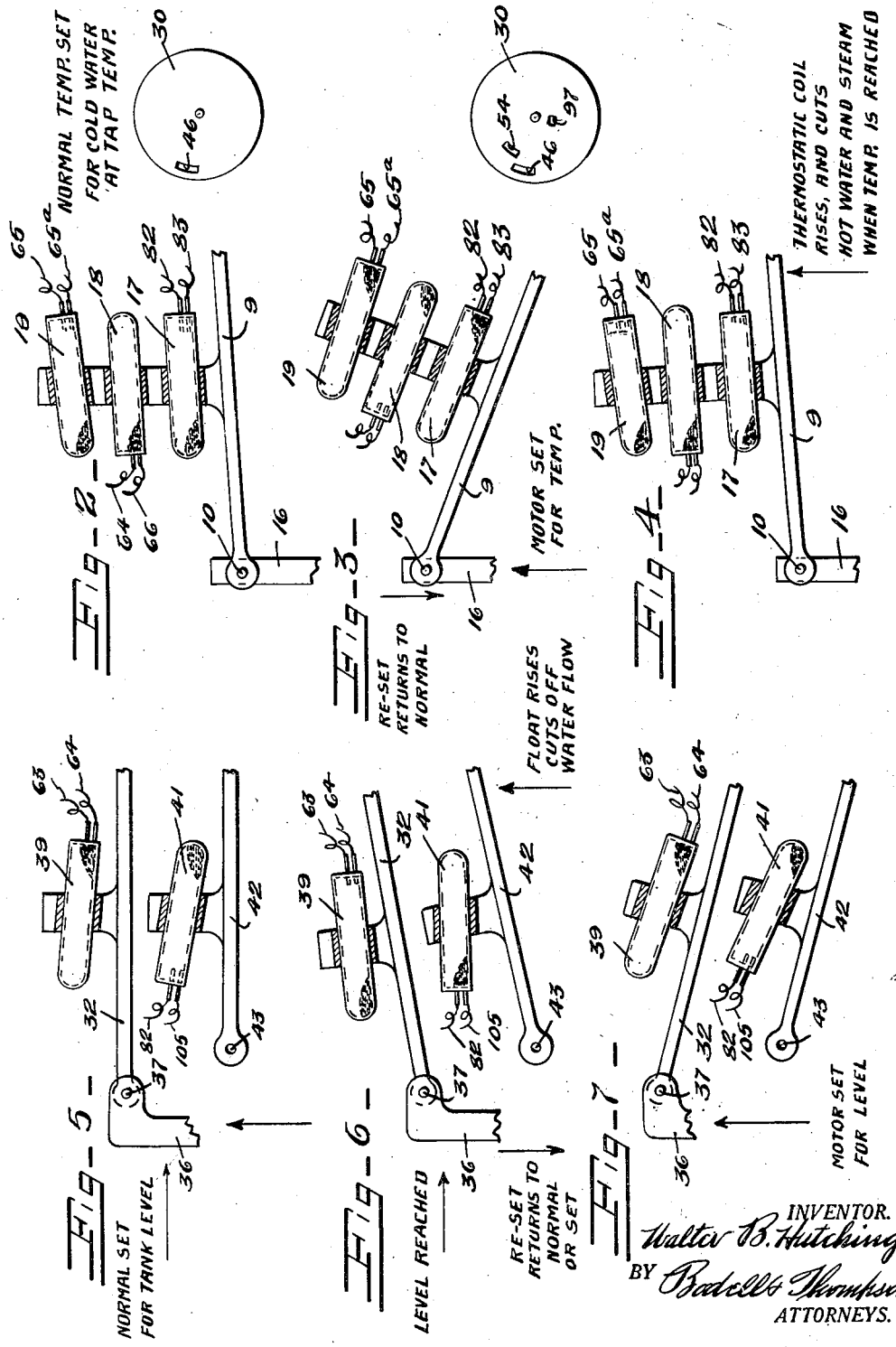

Patented Apr. 11, 1944

2,346,259

UNITED STATES PATENT OFFICE 2,346,259

WATER TEMPERATURE CONTROL

Walter B. Hutchings, Huron, S. Dak., assignor to The Prosperity Company, Inc., Syracuse, N. Y., a corporation of New York Application January 27, 1941, Serial No. 376,028

14 Claims. (Cl. 68—12)

This invention has for its object a control for liquids in a receptacle, as to the status thereof—quantity and/or temperature—such as a washing fluid or liquid in a laundry washing machine, by which the heating of the liquid automatically discontinues when a predetermined temperature is reached, or the flow into the receptacle discontinued when a predetermined level is reached.

It further has for its object the automatic setting of a presetting member in a predetermined position for a predetermined temperature.

It further has for its object an automatic temperature regulator controlling a heating medium combined with the control for the liquid intake of the receptacle in such manner that the intake is opened by the setting of the temperature control and closed when a predetermined level of the liquid is reached by a water level control.

It further has for its object a timer controlled actuating or motor mechanism for the temperature presetting member and also the control of the intake of the liquid into the receptacle through the setting of the temperature control, so that upon the presetting of the temperature control, the intake for the liquid is opened until a predetermined quantity is reached and then closed by a preset water level control, so that in the timer itself, only a minimum number of contact members is required, as one for the temperature control, one for the water level control, but none for the liquid inlet and steam valves, thus eliminating in a timer having a sheet formed with slots, a great number of slots which become ragged and upset the timing.

It further has for its object a repeating or ditto mechanism wherein a plurality of successive tank fillings of a washing fluid of the same status—quantity and temperature—are controlled by the timer through a single contact member of the timer.

It further has for its object an auxiliary control during the repeating or ditto operation, whereby during the dumping operation, the intake for the liquid into the receptacle is temporarily suspended during the dumping operation, while the level and temperature presetting mechanisms remain preset.

Other objects will appear throughout the specification.

The invention consists in the novel features and in the combinations and constructions hereinafter set forth and claimed.

In describing this invention, reference is had to the accompanying drawings in which like characters designate corresponding parts in all the views.

Figure 1 is a diagrammatic view of the temperature control, level control and parts controlled by the operation of the temperature and level controls.

Figure 2 is an enlarged fragmentary, partly diagrammatic, view illustrating the relative angles of steam control switch, cold water control switch, hot water control switch and presetting member of the temperature control when set for water at tap temperature and the timer program sheet with a level control slot only and no temperature control slot.

Figure 3 is a view similar to Figure 2 illustrating the relative positions and angles of the steam, cold water and hot water control switches and the presetting member of the temperature control when in a preset position for a predetermined temperature, the formula sheet with the level control and temperature control slots being also shown.

Figure 4 is a view similar to Figure 3 illustrating shifting of the presetting member and switches operated thereby by the thermostatic member from the position shown in Figure 3, when a predetermined temperature is reached.

Figure 5 is a fragmentary, partly diagrammatic view, showing the relative positions of the level control and steam control switches, the level presetting member and lever carrying the steam control switch of the level control, when in normal starting position and the temperature control presetting member and associated parts are in the position shown in Figure 2.

Figure 6 is a view similar to Figure 5 showing the relative positions of parts seen in Figure 5 after the tank level has been reached.

Figure 7 is a view similar to Figures 5 and 6 showing the relative positions of parts in Figures 5 and 6 after the level presetting member has been set in a predetermined position.

Figure 8 is a detail sectional view illustrating the air relay valves for the motors which operate the hot and cold water, steam and dump valves.

Figure 9 is a detail sectional view illustrating the hot and cold water and steam valves and the operating motors thereof.

In the general aspect of the invention, as the heating medium is steam, the control operable to render the heating means effective and ineffective is a valve in the steam pipe. The control element or elements carried by the presetting member in both the level and temperature controls for operating the control or valve for the heating means or the control for the water valves to close said valves when a predetermined level and a predetermined temperature is reached, are switches, as the motors or actuators for the valves are in a system including magnets.

The level control and the temperature control per se are almost mechanically the same in construction, and in each of them in a broad sense a presetting member is operable from preset position when the mechanism as a whole is in preset position by the predetermined status of the water or liquid. The status in regard to the level control is the quantity and in regard to the temperature control is the temperature, one being sensitive to the quantity or is float operated and the other to the temperature or is thermostatically operated, and each includes a tilting lever or presetting member and a presetting actuator timed and operated preferably by a motor, and a second actuator sensitive to the status of the liquid— quantity or temperature. The lever is fulcrumed on the actuators at opposite ends or spaced apart points so that one actuator lifts one end of the lever upwardly relatively to the other to preset the lever, and the other actuator lifts the other end of the lever upwardly relatively to the former end when in preset position. The control element or elements, in this exemplification of the invention, are mercuroid switches operated by and preferably carried by the lever to be tilted into "on" and "off" positions. The actuators are operated by timer controlled electric motors and are re-set to starting position or no level and no temperature positions by gravity when a pinion driven by each motor is shifted out of mesh with a rack on the companion actuator.

In regard to the temperature control, this invention comprises, generally, a presetting member operable to various predetermined positions for different temperatures, heating means operable to heat the liquid in the receptacle, a control operable to render the heating means effective and ineffective, and as the heating means here shown is steam, the control is a valve; a control element operated by the presetting member for operating the control or valve of the heating means to render the heating means ineffective when a predetermined temperature is reached, this control element being usually an electric switch, as a mercury switch in a circuit, as will be hereinafter described, and thermostatic means operated by the temperature of the liquid in the receptacle to operate the presetting member, and hence the control element or switch to "off" position to effect the operation of the heating means control or valve to shut off the steam when a predetermined temperature is reached. The temperature control is shown as correlated with the liquid or water intake into the receptacle, which is valve controlled, to open the intake during the presetting operation. The water level control is preferably automatic or preset by the timer in predetermined position and operates to close the water intake when a predetermined level is reached and the switch controlling the hot and cold water and steam valves are operated by the combined action of the water level presetting mechanism and the temperature presetting member.

1 designates a suitable receptacle or tank for the liquid or water. This may be a pre-mixing tank or a tank in which the water is prepared as to temperature, quantity, and ingredients or chemicals, preliminary to being discharged into the vat of a washing machine. The receptacle, however, may be the vat of the washing machine itself. The liquid or water is supplied through one or more inlets, as hot and cold water inlets 2, 3, controlled by self-closing valves 4, 5. The water in the receptacle is heated to the desired temperature, and in the illustrated embodiment of the invention, the heating medium is steam, which is supplied through one or more inlets, as the inlet 6 controlled by a self-closing valve 7.

8 designates the temperature presetting mechanism as a whole. 9 is the presetting member thereof which is shiftable into various selected positions for different temperatures. In the illustrated embodiment of the invention, the presetting member 9 is shown as a carrier, as a lever tiltable about two spaced apart fulcrums, one of these fulcrums at 10 being on an actuator or motion transmitting part operable by a motor to different elevations in accordance with the amount of actuation of the motor, and the other of these fulcrums, as 11, being at the upper end of a second actuator or vertical transmitting part or push rod operable to different elevations by thermostatic means operated by the temperature of the liquid in the receptacle 1. 12 designates the motor for the presetting member 9, this being a synchronous electric motor. The motor is suitably mounted to shift and carry a driving part into and out of engagement with a driven part of motion transmitting means actuated thereby. As here shown, the motor is pivoted at 13 to a suitable casing 14 supported in the upper portion of the tank 1, preferably above the highest level of the liquid therein. The motor is a slow running synchronous one which makes about one revolution per minute. As here illustrated, the motor has a shifting movement about its pivot 13 to carry one motion transmitting part, as a pinion 15, out of and into engagement with a second motion transmitting part, as a rack on a vertically movable actuator or slide 16, to the upper end of which the presetting member 9 is fulcrumed or pivoted at 10. The rotation of the rotor of the motor is transferred through the pinion 15 and the actuator or slide 16, to the presetting member 9, to tilt the member 9 about the fulcrum 11 during the presetting operation.

17 designates the control element for the heating means, this being illustrated as a mercury switch operated by the presetting member 9 and as carried thereby to be tilted during the presetting operation into position to close a circuit therethrough and to be tilted by the temperature control to open the circuit when a predetermined temperature is reached. 18 and 19 are similar controls or switches for controlling the opening of the hot and cold water valves 4 and 5 respectively, when the presetting member is operated by the motor 12. The cold water switch 18 is normally closed for a purpose hereinafter explained and is opened by the presetting operation closing the steam and hot water switches 17, 19. The liquid or water flows into the receptacle through the valves 4, 5 and when a predetermined level is reached, the circuit through these switches 18, 19 is opened by a water level control switch.

The water level control mechanism designated 8a, as here shown, includes a float 20 which operates controls, as switches in the water intake circuit, the float operating the switches through an actuator as a push rod 21.

The switches 17, 18 and 19 are arranged on the presetting member 9 of the temperature control at different inclined angles out of the horizontal, as seen in Figure 2. Normally, the switch 17, which controls the steam valve 7, is at such an angle that the circuit is broken through the switch 17, that is, the terminals of the mercury switch are not submerged in the mercury, while the switch 18 which controls the cold water valve 5 is normally at such an inclined angle that the circuit is closed through the switch or its terminals are submerged in the mercury, and the hot water switch 19 is arranged at such an angle that the switch is open or its terminals not submerged in the mercury. The arrangement is such that prior to the presetting of the temperature control, there is a certain amount of cold water in the receptacle 1 before the heating medium or steam is admitted into the receptacle 1. This level is indicated as "tank level" in Figure 1. The purpose of the "tank level" is to avoid excessive vibration and noise that would otherwise occur, if the steam were projected into the empty tank or into the tank above the surface of the water.

23 designates a thermostatic control operated by the temperature of the water or liquid in the receptacle 1, this being shown as a metallic coil 24 around a stud 25 carried by an arm 26, the coil being anchored to the stud at one end and having its other end connected to an upright rod 27 to lift the same, the rod 27 extending upwardly through a tube 28 carried by the casing 14 and thrusting against the presetting member 9, this rod carrying the fulcrum 11 of the presetting member.

29 designates a cycle timer of any suitable type, that here shown comprising a program or formula sheet or disk 30, mounted on a turntable 31, which is actuated by any suitable time movement, usually by a synchronous motor M. The turn-table is of metal, that is, it is an electric conductor, and the formula sheet is of insulation or paper and formed with suitable slots therein to permit contact fingers to engage with the turn-table through the slots when the slots register with the contacts. The contacts control the flow of current to the various switches and electro-responsive devices as magnets, as will be presently described. The timer controls other operations including the opening of a dump or outlet valve through which the water is dumped out of the receptacle to the washing vat, and also the automatic feeding of ingredients into the water in the tank and the operations of the washing machine (not shown). In the formula sheet here illustrated, only those slots are shown which control the operations relating to feeding of the water into the receptacle 1, the temperature, level and the dumping thereof.

The level of the water or liquid in the receptacle 1 is also preferably automatically determined by a presetting member, the operation of which is controlled by the timer. The level setting mechanism 8ª also includes a presetting member 32 actuated to a present position by a motor 33 similar to the motor 12 and pivoted at 34 to be shiftable to carry a pinion 35 into and out of mesh with a rack on an actuator or slide 36 to which one end of the presetting member 32 is pivoted or fulcrumed at 37. The opposite end of the presetting member 32 is fulcrumed at 38 on the push rod 21 operated by the float 20.

39 is a level control switch operated, and for convenience carried by, the presetting member 32. The level presetting mechanism 8ª is carried by a suitable casing 40 similar to the casing 14. The float operated lift rod 21 also operates a switch 41 which controls the closing of the circuit through the steam switch 17 on the presetting member 9 of the temperature mechanism, it being arranged in series with the steam switch 17. This switch 41, so operated by the float 20, is mounted on a carrier or lever 42 pivoted at one end at 43 to the casing 40 and having its other end arranged to coact with a shoulder 44 on the float operated push rod 21. The switch 41, which is a mercury switch, is normally in open position, so that its terminals are not submerged in the mercury and is tilted to a closed position to submerge the terminals when sufficient water has run into the receptacle 1 to fill the tank to the "tank level" designated in Figure 1.

The valves 4, 5, 7 and dump valve 45 are power operated, as by air motors, and the flow of air to the pressure operated motors is controlled by relay valves operated by electro-responsive devices, as solenoids, the energization of which is controlled by the switches of the level and temperature control mechanisms. The water is initially refilled into the receptacle to "tank level" immediately after the dumping operation.

The operation is as follows: Bear in mind that the water in the tank is at "tank level" and that a predetermined level and predetermined temperature are desired for the next operation. It is at "tank level" because when the receptacle is dumped the switches 39 and 18 assume a no level, no temperature position and a circuit is established from wire 48, wire 58, solenoid windings 59, wire 61, contacts 62, wire 64 through switch 18, which is in closed position shown in Figures 1 and 2, thence through wire 66 to the closed water switch 39, which is in the position shown in Figures 1 and 5, thence to return wire 52, closed cold water switch 18, wire 66 to return wire 52. When "tank level" is reached, the level switch 39 is tilted by the action of the float 20 to open the cold water circuit and close the cold water valve 5. During the turning of the timer, the level slot 46 in the formula sheet 30 comes into register with the level contact finger 47, the slot being of such length as to close the circuit through the contact for a sufficient length of time to permit the water to rise to the "high level" or "low level" line in Figure 1. For a "low level" the slot is shorter than for a "high level." The current passes from service wire 48 through wire 49, contact 50 coacting with the turn-table, which is a conductor, thence through the turn-table to the contact 47 which is coacting therewith through the slot 46, thence through wire 51 to one terminal of the synchronous motor 33 out through return wire 52 to the other service wire 53. The motor 33 now running actuates the actuator or slide 36 through the pinion 35, to lift the level presetting member 32 from the tank level position to the position shown in Figure 7, wherein the circuit through the level control switch 39 is closed. The length of time the motor 33 is actuated depends upon the length of the slot 46, and this slot is long enough to permit the actuator or slide 36 to be lifted from starting or normal, when the water is at "tank level" in the receptacle to a predetermined low level designated LL (Figure 1) or high level HL (Figure 1). Immediately after the presetting of the level control, a slot 54 on the formula sheet 30 comes into register with the contact 55 which controls the setting of the temperature control, the current passing from service wire 48 through wire 49, contact 50, turn-table 31, contact 55, wire 56 to one terminal of the motor 12 through wire 57 to return wire 52. The slot 54 is long enough to effect the actuation of the motor 12 long enough to lift the actuator or slide 16 through the pinion 15 to a predetermined height for different predetermined temperatures, as indicated by the lines designed 120°, 140°, 180° (Figure 1). The actuation of the motor 12 and the lifting of the actuator or slide 16 causes the presetting member 9 to be tilted about the fulcrum 11 a predetermined amount from the position shown in Figures 1 and 2 to a position analogous to that shown in Figure 3.

With the level control mercury switch 39 in closed position and the cold water control mercury switch 18 now in opn position, as shown in Figures 5 and 3, the cold water circuit is broken at the switch 18. The presetting of the temperature control closes the steam and hot water switches 17 and 19 (Figure 3) so that the current passes from feed wire 48, through wire 70 to the windings of solenoid or magnet 71 of the water relay valve 72, thence through wire 73 through normally closed contacts 74, wire 75, through wire 65ª, switch 19, which is closed, because set in the position shown in Figure 3, wires 65, 66, water switch 39 to return wire 52 and hot water fills into the receptacle. The operation of the solenoid 71 opens a valve 72 to the flow of air from a suitable source through pipe 67, header 68, valve 72 which opens the flow of air through pipe 76 to a pressure operated means or diaphragm which opens the hot water valve 4 permitting hot water to flow into the receptacle. As the level rises from "tank level" the steam switch 41 of the level control is tilted to "on" position, as in Figure 6. The switch closes at a level a little higher than "tank level" and cuts in the steam through the steam switch 17 on the temperature control (Figure 3), so that the current passes from feed wire 48, through wire 77, windings of solenoid or magnet 78 of the steam relay valve 79, thence through wire 80, through normally closed contacts 81, wire 105 through the closed steam mercury switch 41 on the level control, thence through wires 82 through the closed steam switch 17 (Figure 3) of the temperature control, through wire 83 to the return wire 52, so that the air passes from the header 68 through the valve 79, which is now open, through pipe 7ª to the pressure operated motor which opens the steam valve 7. Thus upon the actuation of the temperature control presetting member 9 by the motor 12 into position shown in Figure 3, the circuit through the cold water control switch 18 is opened, and hence the cold water solenoid 59 de-energized and the cold water valve 5 closed, and the hot water switch 19 and also the steam switch 17 closed, as best seen in Figure 3.

As the water heats under the influence of the steam, the thermostat 23 tilts the presetting member 9 through the rod 27 about the fulcrum 10, until the predetermined temperature is reached, into the position shown in Figure 4, wherein the steam switch 17 and hot water switch 19 are opened. The cold water switch 18, however, is now closed but the circuit through the same is also opened by the water level control through the switch 39 which is in the position shown in Figure 6, due to the action of the float 20, as the predetermined level is reached before the predetermined temperature. The water now in the receptacle is ready for delivery through the dump valve 45 into the washing machine.

As the turn-table 31 continues its rotation, a slot 84 in the formula sheet registers with the contact 85 so that the current passes from the feed wire 48, wire 49, contact 50, turn-table 31, contact 85, wire 86, windings of solenoid 87, which operates an air relay valve 88, through wire 89 to the other service wire 53. The opening of the valve 88 permits air to flow from the header 68 through pipe 90 to a pressure chamber 91 in the dump valve casing 92 to open the dump valve 45. At the same time the current passes from the wire 86 through wire 93 to the windings of a solenoid or magnet 94, thence through wire 95 to return wire 52. The energizing of the magnet or solenoid 94 operates through a rod 95ª to separate the various pairs of contacts 74, 62 and 81, thus opening any circuit which may be closed to the relay magnets 71, 59 and 78 controlling the opening of the hot and cold water and the steam valves, so that these valves 4, 5 and 7 are closed during the dumping operation. When the slot 84 passes the contact 85, the dump valve again closes, and the pairs of contacts 74, 62 and 81 close under the re-action of a spring 96.

After the dumping operation the level and temperature controls are re-set in their starting position, if the next operation requires a different presetting of the level and temperature controls from the previous operation. The re-setting operation is as follows: A slot 97 in the formula sheet registers with a contact 98 after the closing of the dump valve 45 and the current passes from feed wire 48, wire 49, contact 50, turntable 31, contact 98, wire 99 through the windings of an electro-magnet or solenoid 100, thence through wire 101 to wire 57 to the return wire 52. The core 102 of the solenoid 100 is connected to a motion transmitting part or rod 103 which is coupled to the motors 12 and 33 and which serves to shift these motors about their pivots 13 and 34 to carry the pinions 15 and 35 out of mesh with the racks on the slides 16 and 36 respectively, permitting the temperature control mechanism and the level control mechanism to return by gravity to starting position, the action of this shifter rod 103 by the magnet 100 being against the action of a returning spring 104. The level control mercury switch 39 and its companion steam switch 41 being now in the position shown in Figure 5 and the steam and hot water control switches 17, 19 associated with the temperature control and also the cold water switch 18 being in the position shown in Figure 2, in which the cold water control switch is closed or its terminals submerged in the mercury, while the hot water switch and the steam switch are open, so that after the closing of the dump valve, the cold water can flow into the tank up to "tank level" (Figure 1) in which the nozzle of the steam pipe 6 is submerged in the water.

When consecutive washing operations require the same quantity and temperature of water, the re-set slot 97 is located with respect to the dump slot 84, the required distance for the plurality of consecutive operations, so that the level and temperature controls are set for the first operation and remain in preset position until the end of the last of a plurality of repeated operations, except for movements of the presetting members 9 and 32 about the fulcrums 10 and 37. Thus, during and after the dumping operation, the presetting mechanism, that is, the actuators or slides 16 and 36, presetting members 9 and 32, remain in their preset position, but the circuits to the magnets 71, 59 and 78 have been opened during the dumping operation at the contacts 74, 62 and 81, as has been explained. During the dumping operation, the float 20 falls and tilts the presetting member 32 about its fulcrum 37 and hence the water level switch 39 closes in the position shown in Figure 1 or Figure 5, and also the cold water switch 18 operated by the movement of the presetting member 9 of the temperature control mechanism will be in closed position (Figure 4). Between the consecutive operations, the thermostat 23 does not re-act immediately or does not appreciably change the relative angle of the presetting member 9 from its preset position, as shown in Figure 4, to its re-set relative position shown in Figure 3. Thus, with the mercury switch 39 of the level control closed and also the cold water switch 18 of the temperature control closed, and the dump slot 84 having passed out of register with the dump contact 85, a circuit is established as follows: From feed wire 48, wire 58, windings of magnet 59, wire 61, contact 62, wires 63, 64, closed switch 18, which is in the position shown in Figure 4, wire 66, closed wire 39, to the return wire 52, so that now the cold water valve 5 is opened and cold water immediately flows into the receptacle to the "tank level" (Figure 1), whereupon the float 20 is lifted, tilting the presetting member 32 and the switch 39, but not enough to break the circuit therethrough, and also tilting the lever 42 sufficiently to close the steam switch 41 of the level control. The thermostat 23 under the influence of the cold water may have contracted to some extent but whether it has or not, the switches 17, 18 and 19 occupy a position analogous to that shown in Figure 3, wherein the mercury steam control switch 17 is closed, the cold water switch 18 open and the hot water switch 19 closed, so that a circuit is established through hot water solenoid 71 and steam solenoid 78, as before described.

If during repeated operations, a higher level and/or higher temperature is desired, it is merely necessary to cut a slot for the level contact 47 or the temperature contact 55, so that the circuit through the motors 12 and 33 may be actuated a predetermined amount, sufficient to lift the actuators or slides 16 and 36 to a higher position from their preset position. If, however, a lower temperature or level is desired, it is necessary to permit the temperature and level controls to return to starting position and be again preset up to the level and temperature elevation desired. This is done by providing the necessary reset slots in the formula sheet.

The solenoid operated valves 72, 60, 79 and 88; the hot, cold and steam valves 4, 5 and 7, and the dump valve 45, may be of any suitable construction. The valves 72, 60, 79 and 88 are the same in construction, and one of them is illustrated in Figure 8. That here shown consists of a combined normally closed air intake and normally open exhaust valve member 108 in the valve casing, as 72, the valve member being held in its normal position by a returning spring 109. When the solenoid 71, 59, 78 or 87 is energized, this valve member, which is connected to the core of the solenoid, is operated to open the intake valve head 110 and close the exhaust valve head 111, so that air can pass from the header 69 through the valve, past the open valve head and out through the pipe 76, 69, 7ª or 90 to the pressure operated motor of the hot water, cold water, steam valve or the dump valve. When the solenoid is de-energized, the valve member 108 is returned to its normal position by the spring 109 so that the exhaust valve head is open, permitting the air from the pressure operated motors of the valves to exhaust back and out through the exhaust port 112 of the valve casing. The pressure operated motors for the hot and cold water valves and steam valve may also be of any desirable construction and are of the same construction. They are illustrated in Figure 9, wherein 113 designates a valve member in the form of a flexible diaphragm normally seated on a valve seat 114 and operated by a diaphragm 115 in a diaphragm chamber 116. The valve member 113 is held closed by a spring 117. The diaphragm opens the valve against the action of a spring the diaphragm chamber 116 on the pressure side thereof communicates with the intake pipe, as 76, leading from the valve casing 72, 60 or 79. The pressure operated motor for the dump valve 45 consists of a diaphragm 118 in a diaphragm chamber 91 communicating with the pipe 90 leading from the valve 88, the diaphragm acting against the stem 120 of the exhaust valve 45 to open it against the action of a returning spring 121 when the valve 88 is opened by its solenoid 87. When the valve 88 closes, the air in the diaphragm chamber 119 exhausts back through the valve 88.

In the general operation, starting with the water at "tank level," the level slot 46 of the formula sheet comes into register with the contact 47 causing the motor 33 to be energized and set the water level control to a predetermined low level or high level position, the position being determined by the length of the slot 46. The water control switch 39 of the level control mechanism is now closed but the steam control switch 41 open, and likewise the cold water control switch 18 of the temperature control is closed as the temperature control has not yet been preset. The steam control switch 17 and the hot water control switch 19 associated with the temperature control are also open. The water control switches 39 and 18 being closed and the cold water valve now being open, cold water flows into the tank, which starts at "tank level." As the water rises above "tank level," the float 20 tilts the presetting member 32 of the level control and also the carrier 42 for the steam control switch 41 sufficiently to open the cold water control switch 39 and close the steam control switch 41. Then the temperature control slot 54 of the formula sheet registers with the contact 55 closing the circuit through the temperature control motor 12 so that the motor being actuated, the temperature control presetting mechanism is moved to a preset position depending upon the length of the slot 54, to set the presetting member in any selected position of 120°, 140° and 180°. This operation tilts the presetting member 9 about the fulcrum 11 closing the hot water control switch 19 and also the steam control switch 17, and tilts the cold water control switch 18 on the temperature control to "off" position, thus opening the steam valve and the hot water valve, and hot water and steam are being fed into the tank. For the sake of accuracy, the level is reached before the temperature is reached. As the level rises, the float so rises. When the level is reached, the water control switch 39 of the level control is tilted to "off" position, thus cutting out both hot and cold water. Also, the carrier for the steam control switch 41 of the level control is tilted but farther toward "on" position, so that the steam continues to flow into the tank after the level is reached.

As the temperature rises, the thermostat 23, through the rod 27 lifts the temperature presetting member 9 about the fulcrum 10 until a predetermined temperature is reached, when the tilting movement of the presetting member 9 tilts the steam control switch 17 sufficiently to break the circuit, opening the steam circuit. The dump slot 84 then registers with the dump contact 85, closing the circuit through the solenoid 87 controlling the dump valve and the dump valve is opened, this slot being long enough to permit all water to drain out of the tank. Also, when the dump slot 84 registers with the dump contact 85, the circuit through the solenoid 94 is closed to separate the contacts 74, 62 and 81, and thus open all water and steam circuits to avoid closing of the same during the dumping operation. After the dumping operation, the reset slot 97 registers with contact 96, causing the circuit through the solenoid 100 to shift the motors 12 and 33 to carry the pinions 15 and 35 out of mesh with the racks of the actuators 16 and 36, permitting the temperature control and the level control actuators to return to their starting position. This return movement closes the cold water control switch 18 of the temperature control and also closes the water control switch 19 of the temperature control and the steam control switch 41 of the level control. The cold water circuit now being closed, cold water flows into the tank up to "tank level," when under the action of the float 20. The presetting member 32 is tilted far enough to tilt the water control switch 39 to "off" position.

When a plurality of successive washing operations are to be performed, using the same amount of water at the same temperature, a formula sheet is used with the preset slot 97 located farther away in a circumferential direction from the dump slot 84 or far enough away for the number of like operations requiring water of the same quantity and temperature. Therefore, after one dumping operation, the circuits through the steam and water valves remain open at the contacts 74, 62 and 81 and the circuits through the presetting motors 12 and 33, through the solenoid 100 remain open, so that during all dumping operations, except the last of the repeated operations, the actuators 16 and 36 remain in preset position. However, during the dumping operation, the float 20 will fall, and hence the water control switch 39 of the level control will move to closed position and the steam control switch 41 of the level control to "off" position. Likewise the temperature control will remain practically in the position in which it has been set by the thermostat 23, wherein the cold water control switch 18 is closed and the steam control switch 17 and hot water control switch 19 are open; thus at the end of the dumping operation, the cold water control switches being closed and the contacts 74, 62 and 81 being closed, by reason of the dump slot 84 passing out of register with the dump contact 85, cold water will be fed into the tank to "tank level" and remain at "tank level" until a presetting slot again registers with a presetting contact.

If the temperature should be reached before the level, the cold water switches 39 and 18 would close, opening the cold water valve. This would result in a lowering of the water temperature to below the predetermined point and in again cutting in the steam and hot water. For extreme accuracy, the flow of water is correlated to reach the level before the temperature is reached.

What I claim is:

1. The combination of a temperature control for the liquid in a receptacle and a level control for the liquid for controlling the flow of liquid into the receptacle, the temperature control including a presetting member operable to various predetermined positions, a level control for controlling the flow of liquid into the receptacle including a presetting member, heating means operable to heat the liquid in the receptacle and a control therefor operable to render the heating means effective and ineffective, a first control element operated by the temperature control presetting member when in a preset position for operating the control of the heating means to render the heating means effective, and a second control element acting in conjunction with, or in series with, the first control element to render the heating means effective, carried by the level presetting mechanism and operable thereby into operative position by the operation of the level control mechanism when the level is reached, the first control element being movable into inoperative position when the predetermined temperature is reached.

2. The combination set forth in claim 1 in which the first and second control elements are mercury switches controlling the opening and closing of a valve in a steam supply pipe which supplies steam as a heating element to the receptacle, the switch carried by the temperature control presetting member being shifted to open position when a predetermined temperature is reached and the switch operated by the water level control being moved to closed position when a predetermined level is reached, whereby the steam enters the receptacle after the level is reached and before a predetermined temperature is reached.

3. The combination of a temperature control for a liquid in a receptacle, a valve controlled conduit through which the liquid is fed into the receptacle and a level control for the liquid, the temperature control including a presetting member operable to various predetermined positions, means for presetting said member, a level control including a presetting member, means for presetting the same, a first control element shiftable into operative position by the presetting of the temperature control presetting member, a second control element acting in conjunction or in series with the former and shiftable into operative position by the presetting of the level control presetting member, and means controlled by said control elements for opening the valve in the liquid feed pipe when both of said elements have been shifted into operative position.

4. The combination of claim 3 in which the operation of the valve is controlled by electro-responsive device and said control elements are switches connected in series in the circuit for said electro-responsive device, the switch operated by the presetting member of the temperature control being closed when the temperature control is in preset position and opened by the operation of the temperature presetting member when a predetermined temperature is reached and the control element operated by the level control mechanism being a switch closed by the presetting of the level control mechanism and opened when the predetermined level is reached.

5. The combination with a receptacle having a valve controlled inlet for fluid to be fed into the receptacle, and heating means operable to heat the liquid in the receptacle; of a control operable to render the heating means effective and ineffective, presetting mechanism including a presetting member operable to different predetermined positions, a control element operated by the presetting member when in a preset position for operating the control for the heating means to render the heating means effective, a thermostat operated by the temperature of the liquid in the receptacle for operating the presetting member oppositely to its operation by the presetting mechanism when said mechanism is in a preset position, means for operating the presetting member, a control element operated by the presetting member when in a preset position, and level operated means to effect the closing of the inlet valve, including an additional control element acting in conjunction with the control element which is operated by the presetting member, so that both control elements operate to control the opening of the inlet valve.

6. The combination with a receptacle having a valve controlled inlet for fluid to be fed into the receptacle, and heating means operable to heat the liquid in the receptacle; of a control operable to render the heating means effective and ineffective, a presetting member operable to different predetermined positions, a control element operated by the presetting member when in a preset position for operation the control for the heating means to render the heating means effective, a thermostat operated by the temperature of the liquid in the receptacle for operating the presetting member oppositely to its operation by the presetting mechanism when said mechanism is in a preset position to render the heating means ineffective, timer controlled means for operating the presetting member, a control element operated by the presetting member, and a water level control mechanism operable to close the valve of the fluid inlet when a predetermined level is reached in the receptacle, an additional control element operated by the level control mechanism and being connected to the control element operated by the presetting member, so that both of said control elements operate in conjunction to control the opening of the fluid inlet valve, whereby the presetting of the temperature control by the timer opens the fluid intake valve and also renders the heating means effective and the temperature control renders the heating means ineffective when the predetermined temperature is reached, and the water level control closes the fluid inlet valve when the predetermined level is reached.

7. The combination with a receptacle having a valve controlled inlet for fluid to be fed into the receptacle, and heating means operable to heat the liquid in the receptacle; of a control operable to render the heating means effective and ineffective, a presetting mchanism including a presetting member operable to predetermined positions, a control element operated by the presetting member when in a preset position for operating the heating means control to render the heating means effective, a thermostat operated by the temperature of the liquid in the receptacle for operating the presetting member oppositely to its operation by the presetting mechanism when said mechanism is in the preset position to render the heating means ineffective, a second control element operated by the presetting member, timer controlled means for operating the presetting member and for the rendering of the heating means effective, and a water level control and an additional control element operated thereby for effecting the closing of the fluid inlet valve when a predetermined level is reached, the additional control element being connected to the second control element to operate in conjunction therewith to open the fluid inlet valve, when the temperature control is in a preset position and the liquid in the receptacle below a predetermined level.

8. The combination with a receptacle having a valve controlled inlet for liquid to be fed into the receptacle, and heating means operable to heat the liquid in the receptacle; of a control operable to render the heating means effective and ineffective, a presetting mechanism including a presetting member operable to predetermined positions, a control element operated by the presetting member when in a preset position for operating the heating means to render the heating means effective, a thermostat operated by the temperature of the liquid in the receptacle for operating the presetting member oppositely to its operation by the presetting mechanism when said mechanism is in the preset position to render the heating means ineffective, a second control element operated by the presetting member, water level presetting mechanism operated to different positions for different levels including a presetting member, and an additional control element operated by the latter presetting member, said second control element being connected together, whereby either affects the operation of the other, and both acting in conjunction to control the opening of the inlet valve when the presetting member is in preset position, and timer controlled means for each of the presetting members.

9. The combination with a receptacle having a valve controlled inlet for liquid to be fed into the receptacle, and an outlet with a dump valve therein, and heating means operable to heat the liquid in the receptacle; of a control operable to render the heating means effective and ineffective, a presetting mechanism including a presetting member operable to predetermined positions, a control element operated by the presetting member when in a preset position for operating the heating means control to render the heating means effective, a thermostat operated by the temperature of the liquid in the receptacle for operating the presetting member oppositely to its operation by the presetting mechanism when said mechanism is in the preset position to render the heating means ineffective, a second control element operated by the presetting member, water level presetting mchanism operable to different positions for different levels including a presetting member, and an additional control element operated thereby, the additional control element and the second control element operating jointly for controlling the closing of the liquid intake valve when a predetermined temperature and level is reached, timer controlled means for opening the dump valve, timer controlled resetting means for the temperature and level control mechanisms, means controlled by the timer for preventing presetting of the temperature and level control mechanisms upon the operation of the dump valve, and means operable by the opening operation of the dump valve for closing the liquid intake valve and for rendering the heating means ineffective during the dumping operation.

10. A temperature control for the liquid in a receptacle having an intake conduit and a valve therein, said control including a presetting member, motor means for presetting said member, motion transmitting connections between the motor means and the presetting member, heating means for the liquid in the receptacle, and a control therefor operable to render the heating means effective and ineffective, means for controlling the closing of the valve including a control element operated by the presetting member, a second control element operated by the presetting member for operating the control for the heating means to render the heating means effective, a timer for controlling the operation of the motor means, and hence the presetting operation of the presetting member, means operated by the temperature of the liquid in the receptacle to operate the presetting member to effect the operation of the first presetting member for closing of the valve and the operation of the heating means control to render the heating means ineffective independently of the timer and the operation of the presetting member by the timer when a predetermind tmperature is reached, said means for controlling the closing of the valve also including a water level control operated by the quantity of water in the receptacle including a control element operable by the water level control and connected to the first control element to act in conjunction therewith to effect the closing of the intake valve when a predetermined level is reached.

11. A temperature control for the liquid in a receptacle including a presetting member operable to various predetermined positions, motor means for presetting said member, motion transmitting connections between the motor means and the presetting member, heating means operable to heat the liquid in the receptacle, and a control therefor operable to render the heating means effective and ineffective, a control element operated by the presetting member when in a preset position for operating the control of the heating means to render the heating means effective, a timer for controlling the operation of the motor means, and hence the presetting operation of the presetting member, and means operated by the temperature of the liquid in the receptacle to operate the control element to effect the operation of the heating means control to render the heating means ineffective when a predetermined temperature is reached, said connections comprising motion transmitting parts, one being normally engaged with the other and shiftable out of engagement therewith, timer controlled means operable to shift the shiftable transmitting part out of engagement with the other motion transmitting part to permit the presetting member to return to its normal position.

12. In a temperature control for a liquid in a receptacle including a presetting member operable to various predetermined positions, heating means operable to heat the liquid in the receptacle, an electric circuit and control switch therein operated by the presetting movement of the presetting member into closed position to render the heating means effective, electric motor means for effecting the operation of the presetting member, means operated by the temperature of the liquid in the receptacle to shift the presetting member relative to its motor means to open the control switch to render the heating means ineffective when a predetermined temperature is reached, a timer and circuits therefor including branch circuits controlled thereby to the motor means, and release means controlled by the timer for permitting the return of the presetting member to starting position.

13. In a temperature control for a liquid in a receptacle including a presetting member operable to various predetermined positions, heating means operable to heat the liquid in the receptacle, an electric circuit, a control switch therein operated by the presetting movement of the presetting member into closed position, electric motor means and a circuit therefor for effecting the presetting of the presetting member, means operated by the temperature of the liquid in the receptacle to shift the presetting member relative to its motor means to open the control switch to render the heating means ineffective when a predetermined temperature is reached, release means for permitting the return of the presetting member to starting position, the receptacle having an intake having a valve therein, and an outlet having a valve therein, electrically operated means for controling the opening of the valves respectively, the means for controlling the operation of the intake valve including a normally open switch means operated by the presetting member to close the circuit through the electrically operated means for the intake valve, a timer and circuits controlled thereby including branch circuits to the motor means, the last mentioned switch, the release means and to the electrically operated means for the outlet valve.

14. Temperature control mechanism for regulating the temperature of a liquid in a container comprising means including a valve for supplying heating medium to said container, a timer, a thermostat responsive to temperature in said container for controlling said valve, means biased to a normal position and regulable therefrom to advanced positions to vary the control point of said thermostat to determine different temperatures in said container, drive means for advancing said second named means, an electric motor for operating said drive means and having an energizing circuit, a switch in said circuit operated by said timer to cause energization of said motor at a predetermined time and for a predetermined period, releasable means for retaining said second named means in its advanced positions, electromagnetic means for releasing said releasable means including a control circuit, and a switch in said control circuit operated by said timer to cause operation of said electromagnetic releasing means at a predetermined time.

WALTER B. HUTCHINGS.